United States Patent
Jackson

(10) Patent No.: US 10,353,273 B2
(45) Date of Patent: Jul. 16, 2019

(54) BACKDROP FOR CHROMA KEY PHOTOGRAPHY WITH PARTIALLY TRANSPARENT BEADING

(71) Applicant: Magic Memories Innovation Limited, Queenstown (NZ)

(72) Inventor: Kevin Mark Jackson, Kingman, AZ (US)

(73) Assignee: MAGIC MEMORIES INNOVATION LIMITED, Queenstown (NZ)

( * ) Notice: Subject to any disclaimer, the term of this patent is extended or adjusted under 35 U.S.C. 154(b) by 0 days.

(21) Appl. No.: 15/812,107

(22) Filed: Nov. 14, 2017

(65) Prior Publication Data

US 2018/0136545 A1    May 17, 2018

Related U.S. Application Data

(60) Provisional application No. 62/421,506, filed on Nov. 14, 2016.

(51) Int. Cl.
    *G03B 15/10*     (2006.01)
    *G02B 5/128*     (2006.01)
    *G03B 15/06*     (2006.01)

(52) U.S. Cl.
    CPC ............. *G03B 15/10* (2013.01); *G02B 5/128* (2013.01); *G03B 15/06* (2013.01)

(58) Field of Classification Search
    CPC .......... G02B 5/128; G03B 15/10; G03B 15/06
    USPC ............................................................ 396/3
    See application file for complete search history.

(56) References Cited

U.S. PATENT DOCUMENTS

| | | | | |
|---|---|---|---|---|
| 5,503,906 A | * | 4/1996 | Olsen | B44C 1/1716 428/204 |
| 5,620,775 A | * | 4/1997 | LaPerre | G02B 5/128 156/298 |
| 2003/0113573 A1 | * | 6/2003 | Pepin | H01F 1/0027 428/553 |
| 2007/0053065 A1 | * | 3/2007 | Nagao | G02B 5/0221 359/599 |
| 2010/0024935 A1 | * | 2/2010 | Jubran | B05D 5/063 152/151 |
| 2013/0300637 A1 | * | 11/2013 | Smits | G03B 35/18 345/8 |
| 2014/0255602 A1 | * | 9/2014 | Bates | B05D 5/063 427/163.4 |
| 2015/0195903 A1 | * | 7/2015 | Sadasivan | B32B 38/10 174/255 |

* cited by examiner

*Primary Examiner* — Clayton E. LaBalle
*Assistant Examiner* — Linda B Smith

(57) ABSTRACT

A screen is provided. The screen includes: a substrate; an adhesive affixed to the substrate; and a mixture of reflective beads and transparent beads affixed by the adhesive to the substrate.

20 Claims, 5 Drawing Sheets

BACKDROP FOR CHROMA KEY PHOTOGRAPHY WITH PARTIALLY TRANSPARENT BEADING

RELATED APPLICATION

Under provisions of 35 U.S.C. § 119(e), Applicant claims the benefit of U.S. Provisional Application No. 62/421,506 filed Nov. 14, 2016 entitled "Backdrop for Chroma Key Photography with Partially Transparent Beading", which is incorporated herein by reference in its entirety.

TECHNICAL FIELD

The present disclosure relates generally to chroma key photography, and more particularly, a screen or floor for chroma key photography with partially transparent beading.

BACKGROUND

Photographers often use a system known as chroma keying, or chroma key, to provide special effects for photographs. Using chroma keying, a background, typically blue or green in color, is placed behind or beneath a subject to be photographed. At the time the photograph is taken, or in post processing, the background is replaced with a different image. Thus, the subject of the photograph can be placed in a variety of locals and situations, without having to actually have those locals or situations in the background.

As mentioned, typically a blue or green colored backdrop is placed behind or beneath the subject. However, these bright green or blue backgrounds are unsightly, so there has been a movement to replace the brightly colored background with a plain gray backdrop. This gray backdrop is typically a fabric backdrop with glass beading affixed to the backdrop. The glass beading is composed of aluminized, reflective glass that serves to reflect a green or blue light that is shined upon it. The green or blue light is sourced from around a camera lens, and, striking the beading at an angle parallel to the lens produces a green or blue light that is reflected off the backdrop back at the camera. The subject of the picture is lit from a different white light source. Unfortunately, these beaded, fabric backdrops are fragile and prone to damage, in addition to being expensive. Also, while they are better than the bright blue or green backdrop, beaded, fabric backdrops only provide a simple, plain gray backdrop.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
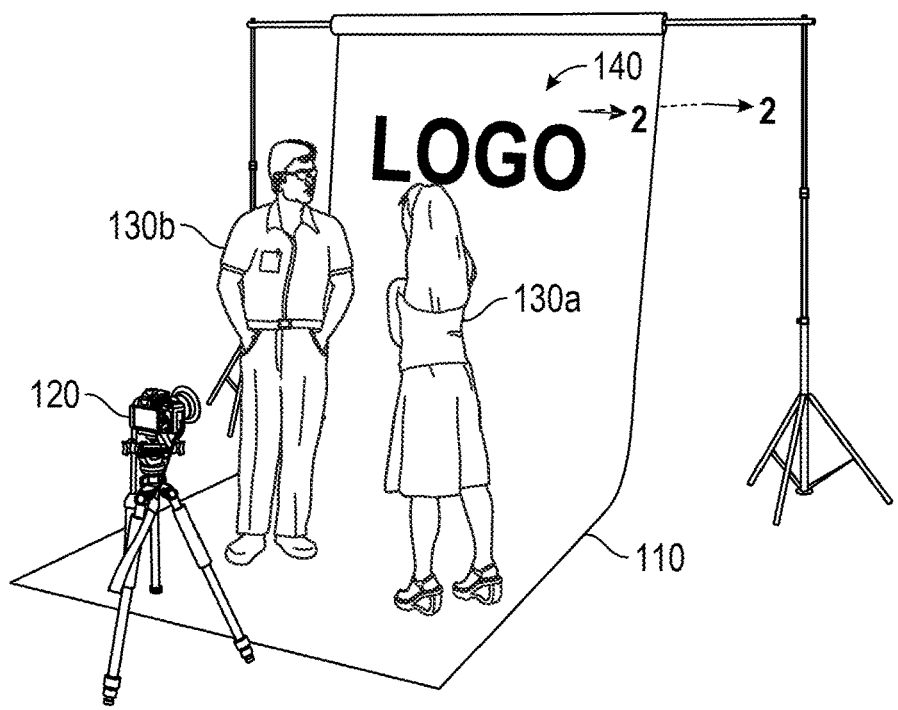
FIGS. 1A and 1B are illustrations of a first screen according to the present disclosure used in a photography context.

Two types of screens are described. These screens are used in chroma key photography, where a colored background is replaced with an image by a computer to make it appear as though subjects in the photograph are placed before the image. Both screens utilize a mixture of aluminized reflective beads and transparent beads to provide a background that will reflect a light from the camera, typically a green or blue light. The first screen includes: a substrate; an adhesive affixed to the substrate; and a mixture of aluminized reflective beads and transparent reflective beads affixed by the adhesive to the substrate. The first screen may have a substrate made from a flexible material or a rigid material. The second screen includes a substrate and a mixture of powder coating, aluminized reflective beads and transparent beads that are affixed to the substrate. No separate adhesive layer is required in the second screen, and the second screen is typically a rigid material, although an electrically conductive flexible material may be used.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Figure 1B:
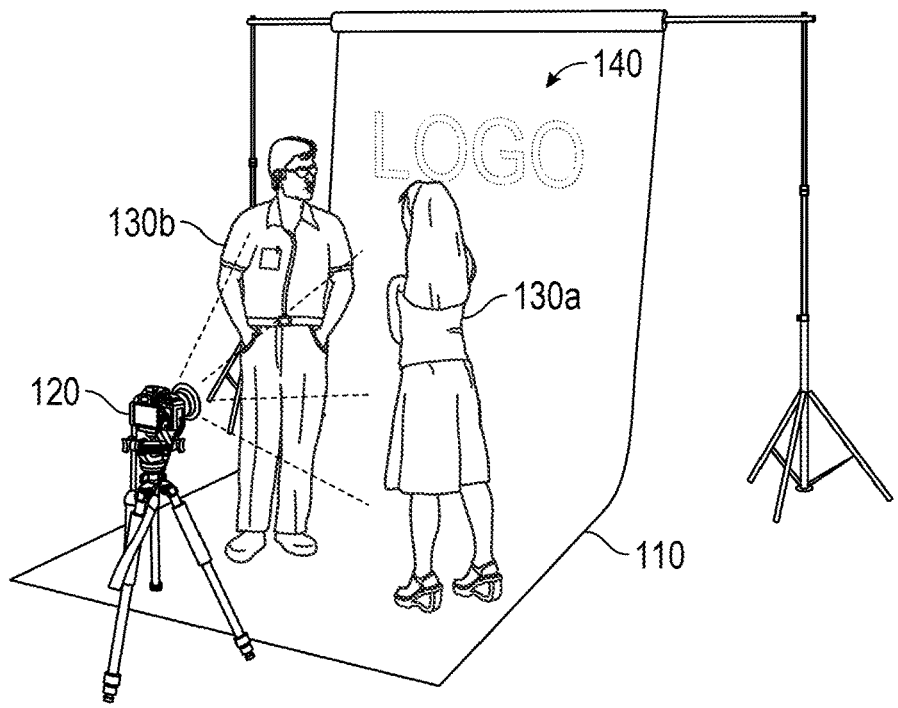

FIGS. 1A and 1B are illustrations of a first screen according to the present disclosure used in a photography context. A screen 110 may be provided as a backdrop for a photography session. The screen 110 includes a substrate which may be a flexible material, such as rubber or plastic (e.g., polypropylene), or a rigid material, such as aluminum or steel. Transparent reflective or aluminized reflective beads or a mixture thereof are affixed to the substrate with an adhesive. Screen 110 may have a graphic 140 placed on the substrate. Because a portion of the beads are transparent, the graphic 140 is visible through the beads when light from a light source, such as a light source around the lens of camera 120 is not shining on screen 110. The details of the screen 110 will be discussed with respect to FIGS. 2 and 3 below. If the screen 110 is a flexible material it may hang down from behind subjects 130 and drape across the floor. Screen 110 may be sturdy enough to support the weight of subjects 130 without breaking.

As mentioned, camera 120 typically has a ring light source, producing green or blue light, affixed around the camera's lens. As shown in FIG. 1A, when no light is coming from the ring light, the graphic 140 is visible through the beading of the screen 110. However, when the ring light produces the green or blue light, for example, when a photograph is in the process of being taken, the graphic 140 is not visible (as shown in FIG. 1B) through the beading of screen 110. This is because the reflective beads of screen 110 reflect the green or blue light, obscuring the visibility of graphic 140.

Figure 2:
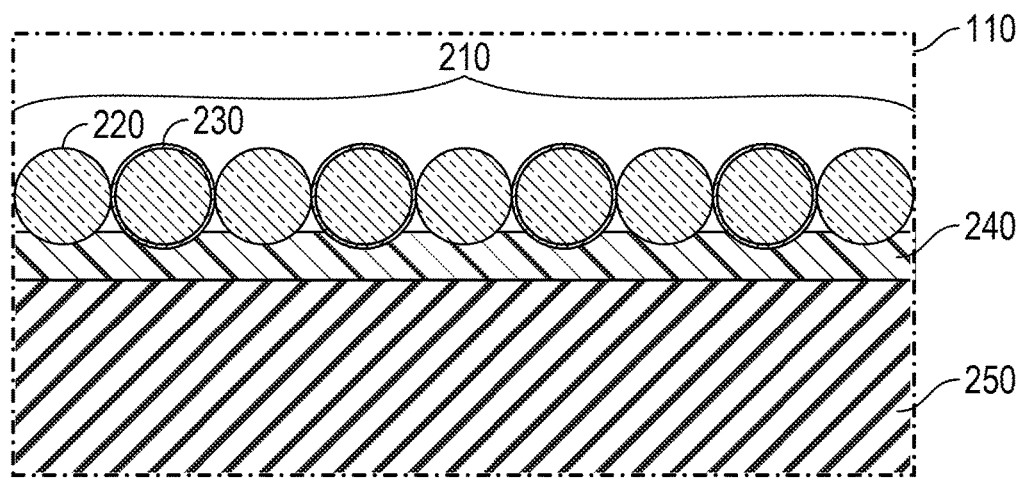
FIG. 2 is a cross section of the first screen produced in accordance with the present disclosure.

FIG. 2 is a cross section of the first screen produced in accordance with the present disclosure. The portions of the screen 110 shown are not to scale, and are illustrated so as to best be able to understand the disclosure. Screen 110 includes a substrate 250. The substrate 250 may be made of a flexible material, such as melamine, plastic, or rubber, or a rigid material, such as aluminum or steel. In one embodiment, substrate 250 may be made of rubber that is approximately three to four millimeters thick. A graphic, comprising either text or graphics, may be applied to the substrate prior to applying adhesive 240. The graphic will be visible through the beads 210, so long as only ambient light is shining on screen 110. However, when green or blue light shines from a ring light around the camera lens onto screen 110, the graphic no longer can be seen on screen 110. The ability to have this "disappearing graphic" on the screen 110 makes for a far more attractive backdrop screen than prior art screens that are either blue, green, or gray.

An adhesive 240 is applied to the substrate 250. The adhesive 240 may be a polymer acrylic material or any other material suitable for affixing beads 210 to substrate 250. For example, adhesive 240 may be a roof patching compound containing coloring agents such as metallic oxides. In one embodiment, Klass Kote™ urethane may be used as adhesive 240.

Following application of the adhesive 240, a plurality of beads 210 are affixed to the adhesive 240. Beads 210 may comprise a mixture of transparent beads 220 and reflective beads 230. The transparent beads 220 may be approximately 98% spherical and are typically about 35-45 microns in diameter. The reflective beads 230 may be aluminized beads that are approximately 50% coated with aluminum and are about 60 microns in diameter. The reflective beads 230 are typically about 50% coated with aluminum or some other reflective material. In an exemplary embodiment, beads 210 are about 50% reflective beads 230 and 50% transparent beads 220. In practice, different mixtures may be used. For example, up to 100% transparent beads may potentially be used.

Production of the screen may be achieved by taking the substrate 250 and applying the adhesive 240 to the substrate 250. Next, beads 210 may be sprayed onto the backdrop 250. A blue or green flashlight can be used to verify even coating of the beads 210 onto the adhesive 240 and substrate 250.

Figure 3:
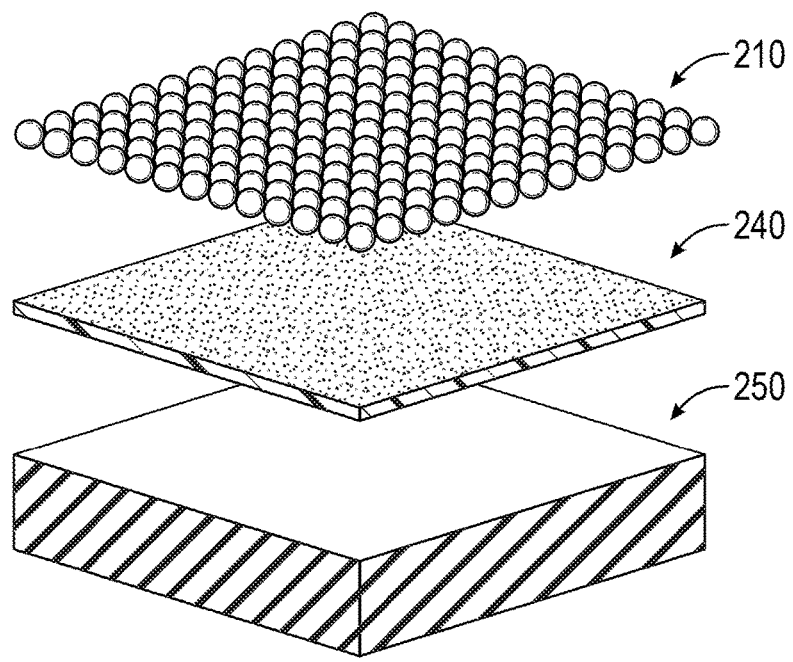
FIG. 3 is an orthogonal blown apart close up of the first screen produced in accordance with the present disclosure.

FIG. 3 is an orthogonal blown apart close up of the first screen produced in accordance with the present disclosure. FIG. 3 is simply another view of a section of screen 110. The substrate 250, adhesive layer 240, and beads 210 are shown separated from each other for ease of understanding, but in practice, these layers of materials are affixed to each other as shown in FIG. 2.

Figure 4A:
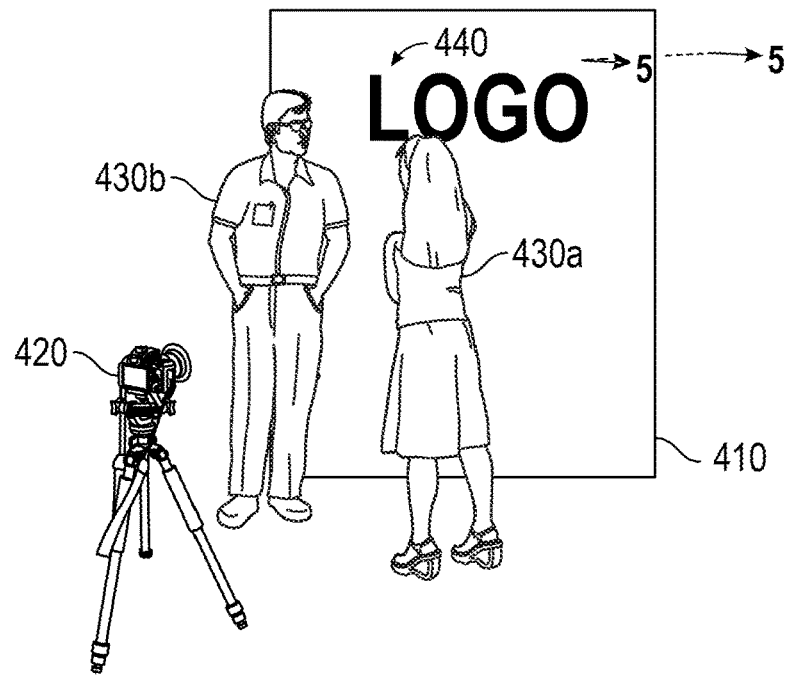
FIGS. 4A and 4B are illustrations of a second screen according to the present disclosure used in a photography context.
Figure 4B:
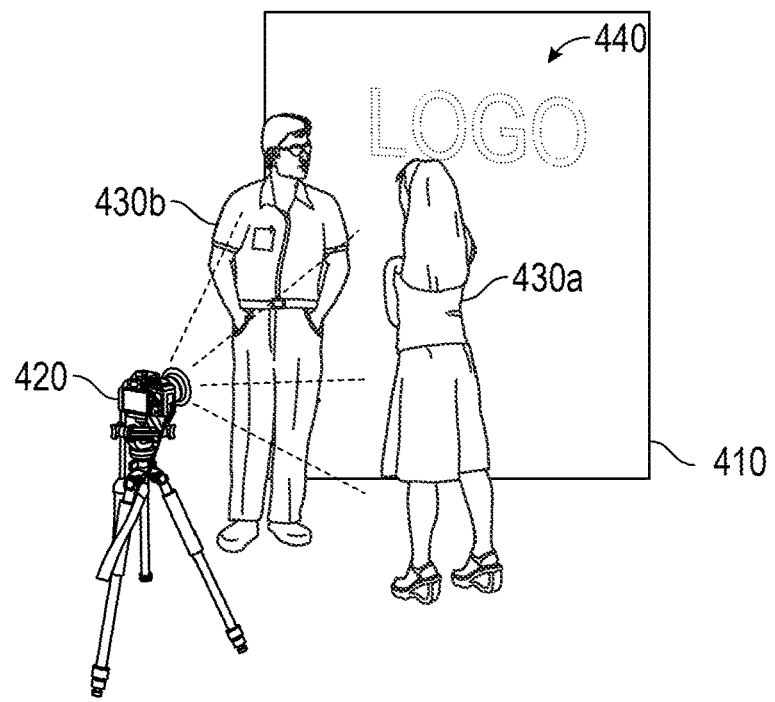

FIGS. 4A and 4B are illustrations of a second screen according to the present disclosure used in a photography context. A screen 410 may be provided as a backdrop for a photography session. The screen 410 includes a substrate which may be a rigid material, such as aluminum or steel. The substrate may be any type of material that is electrically conductive and can withstand heating to 400 degrees Fahrenheit for at least twenty minutes. Transparent reflective or aluminized reflective beads or a mixture thereof are mixed with a powder coating and powder coated onto the substrate. Screen 410 may have a graphic 440 placed on the substrate. Because a portion of the beads are transparent, the graphic 440 is visible through the beads when light from a light source, such as a light source around the lens of camera 420 is not shining on screen 410. Although only a back screen 410 is illustrated, a floor screen may also be provided for subjects 430 to stand upon. The details of the screen 410 will be discussed with respect to FIGS. 5 and 6 below.

As mentioned, camera 420 typically has a ring light source, producing green or blue light, affixed around the camera's lens. As shown in FIG. 4A, when no light is coming from the ring light, the graphic 440 is visible through the beading of the screen 410. However, when the ring light produces the green or blue light, for example, when a photograph is in the process of being taken, the graphic 440 is not visible (as shown in FIG. 4B) through the beading of screen 410. This is because the reflective beads of screen 410 reflect the green or blue light, obscuring the visibility of graphic 440.

Figure 5:
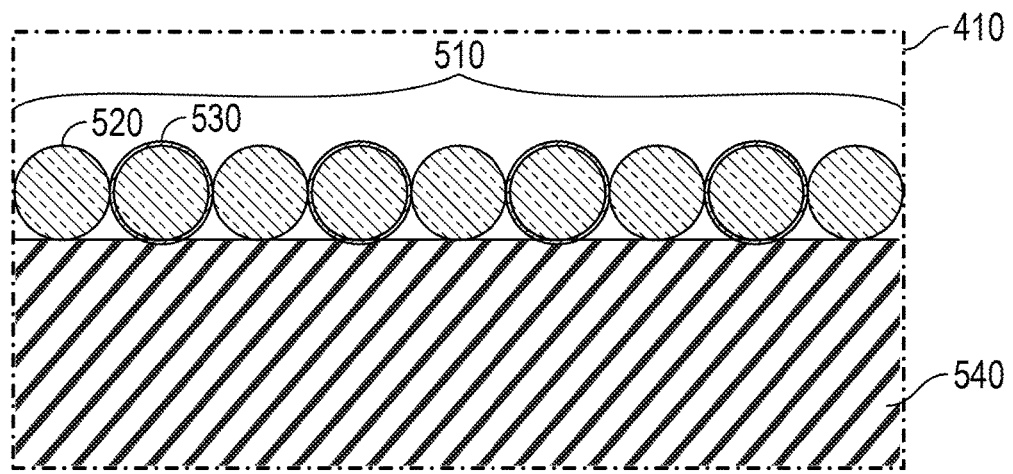
FIG. 5 is a cross section of the second screen produced in accordance with the present disclosure.

FIG. 5 is a cross section of the second screen produced in accordance with the present disclosure. The portions of the screen 410 shown are not to scale, and are illustrated so as to best be able to understand the disclosure. Screen 410 includes a substrate 540. The substrate 540 may be made of a flexible material or a rigid material, such as aluminum or steel. In one embodiment, substrate 540 may be made of aluminum that is 0.5 mm thick, but as previously stated any electrically conductive material that can withstand 400 degrees Fahrenheit for twenty minutes can be used. A graphic, comprising either text or graphics, may be applied to the substrate 540 prior to applying a mixture of transparent beads 520, reflective beads 530, and a powder coating material (collectively 510) that is used to fix the beads to the substrate. The powder coating material is very fine and is not shown in the figure. The graphic will be visible through the beads 510, so long as only ambient light is shining on screen 410. However, when green or blue light shines from a ring light around the camera lens onto screen 410, the graphic no longer can be seen on screen 410. The ability to have this "disappearing graphic" on the screen 410 makes for a far more attractive backdrop screen than prior art screens that are either blue, green, or gray.

A plurality of beads 510 are affixed to the substrate 540. Beads 510 may comprise a mixture of transparent beads 520 and reflective beads 530. The transparent beads 520 may be approximately 98% spherical and are typically about 35-90 microns in diameter. The reflective beads 530 may be aluminized beads that are approximately 50% coated with aluminum or some other reflective material and are about 35-90 microns in diameter. In an exemplary embodiment, beads 510 are about 65% reflective beads 530 and 35% transparent beads 520. In practice, different mixtures may be used. For example, up to 5% transparent beads 520 may potentially be used. The powder coating material is typically a chromium powder and comprises 30% to 50% of the powder coating mixture that is applied, with the balance being beads 510.

Figure 7:
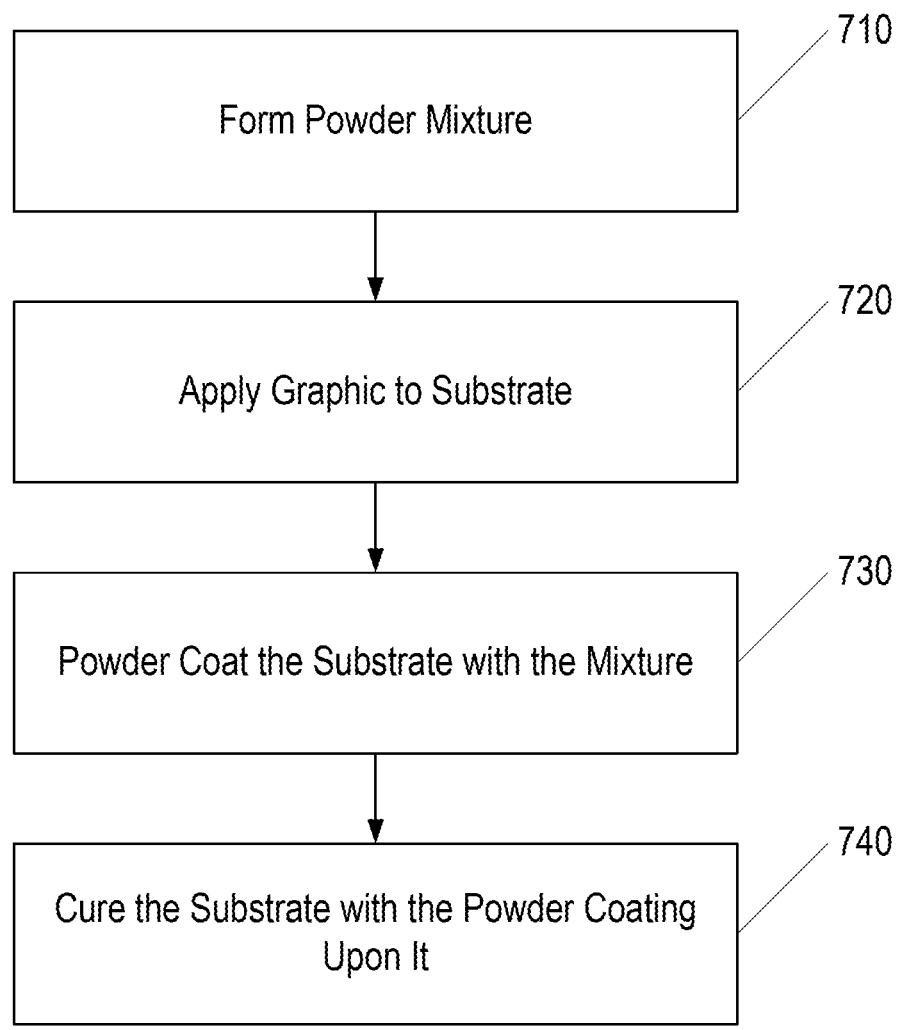
FIG. 7 is a flow chart illustrating the process to make the second screen.

Production of the screen is illustrated in FIG. 7 and may be achieved by forming a powder coating mixture of powder coating material, such as chromium, transparent beads 520 and reflective beads 530 (operation 710). A graphic is applied to a substrate (operation 720). The powder coating mixture 510 is applied to the substrate 540 (operation 730). Then, the substrate 540 with the affixed powder coating mixture 510 is cured at approximately 400 degrees Fahrenheit for about twenty minutes (operation 740). After cooling, a blue or green flashlight can be used to verify even coating of the beads 510 substrate 540.

Figure 6:
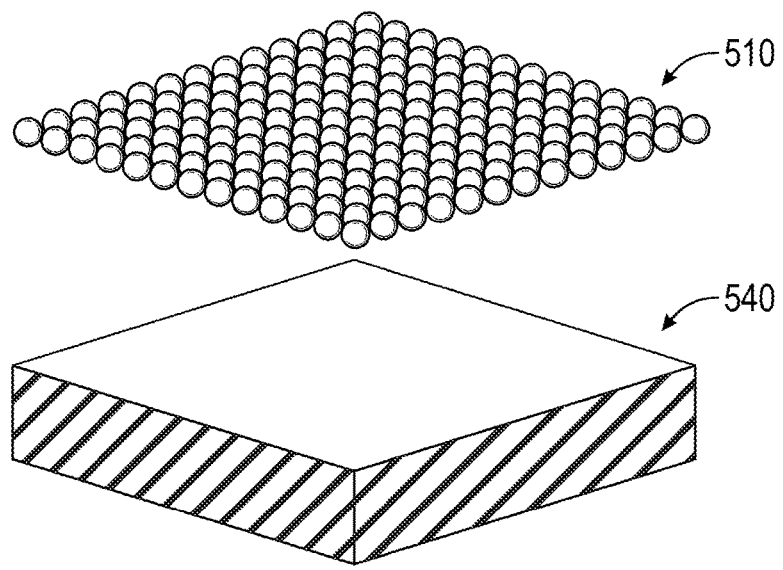
FIG. 6 is an orthogonal blown apart close up of the second screen produced in accordance with the present disclosure.

FIG. 6 is an orthogonal blown apart close up of the second screen produced in accordance with the present disclosure. FIG. 6 is simply another view of a section of screen 410. The substrate 540 and beads 510 are shown separated from each other for ease of understanding, but in practice, these layers of material are affixed to each other as shown in FIG. 5.

Embodiments of the present disclosure, for example, are described above with reference to block diagrams and/or operational illustrations of methods and systems according to embodiments of the disclosure. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A screen, comprising:
   a substrate;
   an adhesive affixed to the substrate; and
   a mixture comprising reflective beads and transparent beads, wherein the mixture is affixed by the adhesive to the substrate, and wherein each individual reflective bead is at least partially coated with reflective material.

2. The screen of claim 1, further comprising a graphic affixed to the substrate beneath the adhesive.

3. The screen of claim 1, wherein the substrate is a flexible material.

4. The screen of claim 3, wherein the flexible material is selected from the group consisting of melamine, plastic, and rubber.

5. The screen of claim 1, wherein the substrate is a rigid material.

6. The screen of claim 1, wherein the adhesive is a polymer acrylic.

7. The screen of claim 1, wherein the adhesive is roof patching compound.

8. The screen of claim 1, wherein the plurality of beads comprise about 50% reflective beads and about 50% transparent beads.

9. The screen of claim 1, wherein the reflective beads are about 50% coated with aluminum.

10. A screen, comprising:
    a substrate; and
    a mixture comprising powder coating, reflective beads, and transparent beads, wherein the mixture is affixed to the substrate, and wherein each individual reflective bead is at least partially coated with reflective material.

11. The screen of claim 10, wherein the substrate is aluminum.

12. The screen of claim 10, wherein the substrate is an electrically conductive material capable of maintaining its integrity after being heated to 400 degrees Fahrenheit for twenty minutes.

13. The screen of claim 10, wherein the powder coating is a chromium or other powder.

14. The screen of claim 10, wherein the mixture comprises about 30% powder coating, about 65% reflective beads and about 5% transparent beads.

15. The screen of claim 10, wherein the reflective beads are approximately 50% coated with aluminum.

16. The screen of claim 10, wherein the transparent beads are about 35 to about 90 microns in diameter.

17. The screen of claim 10, wherein the reflective beads are about 35 to about 90 microns in diameter.

18. The screen of claim 10, wherein the powder coating comprises about 30 to about 50% of the mixture.

19. The screen of claim 10, further comprising a graphic affixed to the substrate.

20. A method of forming a screen, comprising:
    forming a mixture comprising powder coating material, reflective beads, and transparent beads;
    providing a substrate;
    applying a graphic to the substrate;
    powder coating the substrate with the mixture; and
    curing the substrate and the mixture.

* * * * *